US011743051B2

(12) United States Patent
Javaid et al.

(10) Patent No.: US 11,743,051 B2
(45) Date of Patent: Aug. 29, 2023

(54) BLOCKCHAIN MACHINE COMPUTE ACCELERATION ENGINE WITH A BLOCK VERIFY AND A BLOCK VALIDATE

(71) Applicant: XILINX, INC., San Jose, CA (US)

(72) Inventors: Haris Javaid, Singapore (SG); Ji Yang, San Jose, CA (US); Sundararajarao Mohan, Sunnyvale, CA (US); Gordon John Brebner, Monte Sereno, CA (US)

(73) Assignee: XILINX, INC., San Jose, CA (US)

( * ) Notice: Subject to any disclaimer, the term of this patent is extended or adjusted under 35 U.S.C. 154(b) by 172 days.

(21) Appl. No.: 17/083,195

(22) Filed: Oct. 28, 2020

(65) Prior Publication Data

US 2022/0131704 A1 Apr. 28, 2022

(51) Int. Cl.
*H04L 9/32* (2006.01)
*G06F 16/23* (2019.01)
*G06F 30/331* (2020.01)
*H04L 9/00* (2022.01)

(52) U.S. Cl.
CPC ........ *H04L 9/3247* (2013.01); *G06F 16/2336* (2019.01); *G06F 30/331* (2020.01); *H04L 9/321* (2013.01); *H04L 9/50* (2022.05); *H04L 2209/125* (2013.01)

(58) Field of Classification Search
CPC ......... H04L 9/3247; H04L 9/321; H04L 9/50; H04L 2209/125; G06F 16/2336; G06F 30/331
See application file for complete search history.

(56) References Cited

U.S. PATENT DOCUMENTS

| 10,375,105 | B2 | 8/2019 | Kozloski et al. |
| 10,762,479 | B2 | 9/2020 | Hyun et al. |
| 2019/0370806 | A1 | 12/2019 | Wang et al. |
| 2020/0103930 | A1 | 4/2020 | Suresh et al. |
| 2020/0119926 | A1* | 4/2020 | Buki ................... G06Q 20/401 |
| 2020/0143088 | A1 | 5/2020 | Sunkavalli et al. |
| 2020/0177373 | A1* | 6/2020 | Komandur ............ H04L 9/3247 |

FOREIGN PATENT DOCUMENTS

| EP | 3432146 A1 * | 1/2019 | ............ G06F 9/466 |
| EP | 3432146 A1 | 1/2019 | |

\* cited by examiner

*Primary Examiner* — Jeffrey C Pwu
*Assistant Examiner* — Mayasa A. Shaawat
(74) *Attorney, Agent, or Firm* — Patterson + Sheridan, LLP

(57) ABSTRACT

Embodiments herein describe a hardware accelerator for a blockchain node. The hardware accelerator is used to perform a validation operation to validate one or more transactions before those transactions are committed to a ledger of a blockchain. The blockchain may include multiple peer-nodes, each of which contains standard software running on a server or container. Instead of validating a block of transactions using software, the hardware accelerator can validate the transactions in a fraction of the time. The peer-node software then gathers the validation results from the hardware accelerator and combines the results with received block data to derive the block which is committed to the stored ledger.

20 Claims, 5 Drawing Sheets

BLOCKCHAIN MACHINE COMPUTE ACCELERATION ENGINE WITH A BLOCK VERIFY AND A BLOCK VALIDATE

TECHNICAL FIELD

Examples of the present disclosure generally relate to a hardware accelerator for a node in a blockchain.

BACKGROUND

Hyperledger Fabric is an open-source, enterprise-grade implementation platform for permissioned blockchains. The transaction flow in Hyperledger Fabric follows the execute-order-validate model, where a transaction is executed first, then ordered into a block, which is finally validated and committed to the ledger (along with a state database to keep the global state of the blocks committed so far). Consequently, a Fabric network includes different types of nodes, such as peers, orderers, clients, etc., where each node has an identity provided by the Membership Service Provider (MSP).

Permissioned blockchains (like Hyperledger Fabric, Quorum, Corda, and others) are blockchain networks that require access to be part of. These blockchains require transactions to be validated before they are added to the blockchain's ledger. However, the validation process must be performed by certain nodes which often experience a bottleneck when having to validate multiple transactions. This bottleneck can limit the ability of the blockchain to quickly commit new transactions.

SUMMARY

One embodiment describes a computing system that includes a processor, memory storing a ledge of a blockchain, and a hardware accelerator configured to receive a block of transactions to be committed to the ledger, verity a signature of the block, validate each of the transactions in the block, and store validation results of the transactions. Further, one of the processor or the hardware accelerator is configured to commit the transactions to the ledger.

Another embodiment described herein is an integrated circuit that includes a network interface configured to receive a plurality of packets containing a block of transactions from a node in the blockchain, a protocol processor configured to parse the plurality of packets to generate data regarding the transactions, and a block processor configured to verify a signature of the block, validate each of the transactions in the block, and store validation results of the transactions.

Another embodiment described herein is a method that includes receiving, at a hardware accelerator, a block of transactions to be committed to a ledger of a blockchain, verifying, at a hardware accelerator, a signature of the block, validating, at a hardware accelerator, each of the transactions in the block, storing, at a hardware accelerator, validation results of the transactions, and committing the transactions to the ledger and indicating whether the transactions are valid based on the validation results.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Figure 1:
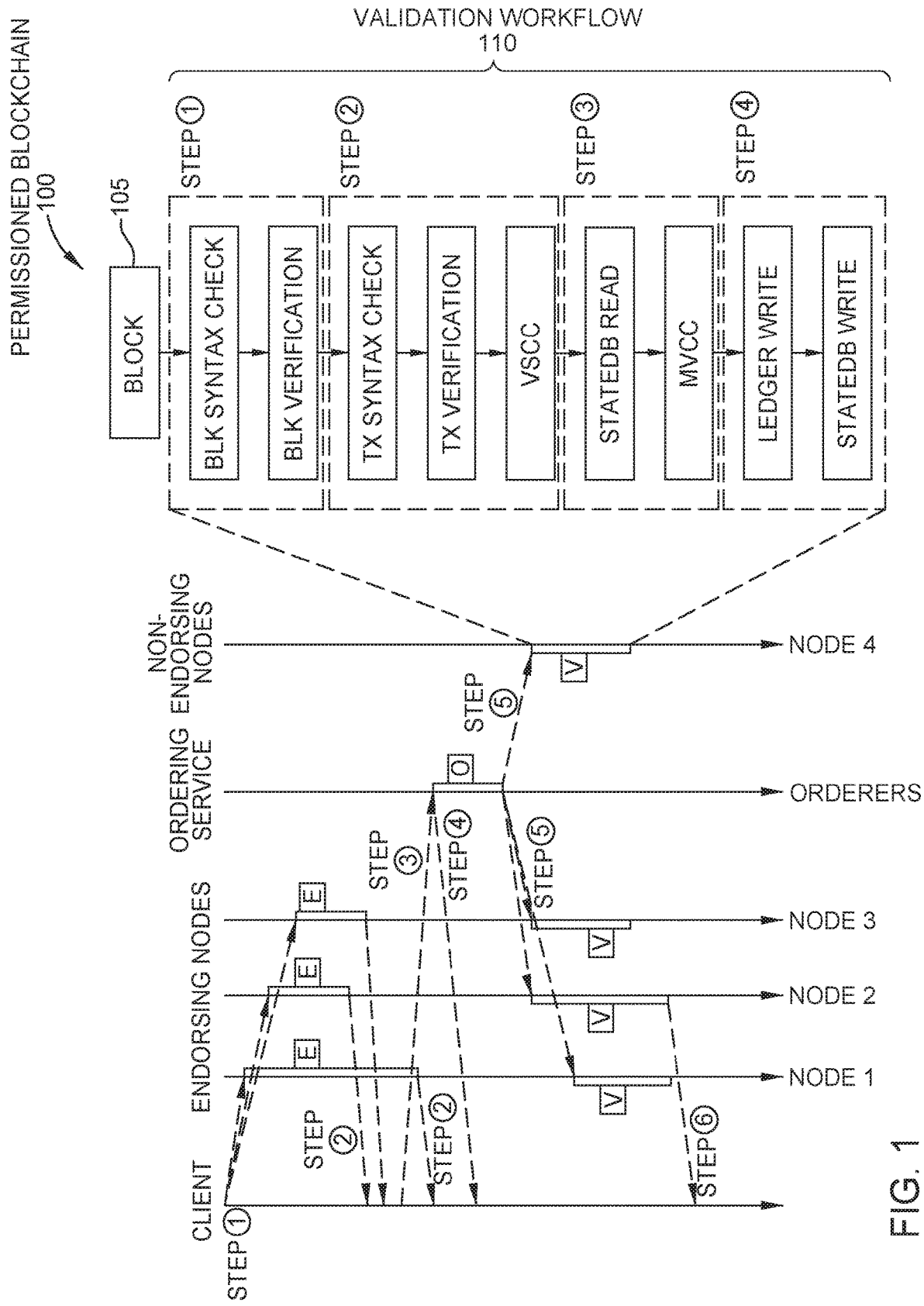
FIG. 1 is a timing chart corresponding to a permissioned blockchain, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a hardware accelerator (e.g., a compute acceleration engine) for a blockchain machine or node. The hardware accelerator is used to perform a validation operation to validate one or more transactions before those transactions are committed (i.e., added) to a ledger of a permissioned or permissionless blockchain. The blockchain may include multiple peer-nodes, each of which contains standard software running on a server or container. Some peer-nodes, known as validator nodes are the main bottleneck for system performance because they need to validate a block of several tens or hundreds of transactions quickly before those transactions can be committed into the blockchain ledger. Instead of validating the block of transactions using software, the hardware accelerator can validate the transactions in a fraction of the time. The peer-node software then gathers the validation results from the hardware accelerator and combines the results with received block data to derive the block, which is then committed to the stored ledger. In an experimental setup, a node with the hardware accelerator, when coupled to a networking acceleration engine, achieved more than 10× improvement in transaction commit throughput compared to a software only peer executing on a multi-core server.

FIG. 1 is a timing chart corresponding to a permissioned blockchain 100, according to an example. While the timing chart of the permissioned blockchain 100 in FIG. 1 specifically pertains to the Hyperledger Fabric, the embodiments herein can apply to any type of permissioned blockchain.

Further, the embodiments herein may also apply to non-permissioned blockchains that perform a validation process on transactions before those transactions are committed to the ledger. Thus, the Hyperledger Fabric is provided as just one example of a suitable blockchain network that can benefit from the hardware accelerator described below.

The transaction flow in the blockchain 100 follows an execute-order-validate model, where a transaction is executed first, then ordered into a block, which is finally validated and committed to the ledger (along with a state database to keep the global state of the blocks committed so far). Consequently, the permissioned blockchain 100 includes different types of nodes, such as peers, orderers, clients, etc., where each node has an identity provided by the MSP. This identify can be provided in the form of a certificate.

The client can be any entity that submits a transaction to be committed on the blockchain 100. For example, if the blockchain 100 is used by a financial institution to track money transfers, the client may submit a transaction to move funds from a first account to a second account (at the same financial institution or a different institution). At step 1, the client submits a transaction to be committed to the blockchain. Specifically, the transaction is received on multiple endorsing nodes (or peers). An endorsing node both executes/endorses transactions and validates/commits blocks to the ledger. Each endorsing node executes the transaction against its own state database, to compute the read-write set of the transaction (marked as E in FIG. 1). The read set is the keys accessed and their version numbers, while the write set is the keys to be updated with their new values.

If the endorsement process is successful (i.e., there are no errors), at step 2, the endorsing nodes add their endorsement to the transaction and return the transaction to the client. After the client has gathered a sufficient number of endorsements, at step 3, the client asks an ordering service to submit the transaction to a validation process. In one embodiment, the ordering service includes orderers (e.g., computing nodes) which use a consensus mechanism to establish a total order for the transactions. Multiple pluggable consensus mechanisms are available, such as Raft and Apache Kafka/Zookeeper based consensus mechanisms.

At step 4, the ordering service responds back to the client after the transaction has been accepted for inclusion into a block (step 4). The ordering service then creates a block 105 of transactions from the ordered transactions. In one embodiment, the ordering service creates the block 105 from the ordered transactions when either a user-configured timeout has expired or user-configured limit on block size is reached.

Once a block 105 is created, the ordering service broadcasts it to all the endorsing and non-endorsing nodes through, e.g., a Gossip protocol at step 5. Each node validates all the transactions in the block 105 and then commits the block to the ledger and state database (marked as V). Finally, one of the nodes sends a notification to the client that the transaction has been committed or whether the transaction was marked as invalid or valid in the ledger (step 6).

FIG. 1 shows a validation workflow 110 of the validation phase in more detail on the right-hand side. The workflow 110 shows four steps which are performed on every node that receives the block 105. On receiving the block 105 of transactions from the ordering service (or a lead node) through the Gossip protocol, at step 1, the node checks the syntactic structure of the block and verifies its signature, and then sends it through a pipeline of various operations which are described in more detail blow. In step 2, each transaction in the block is syntactically checked and its signature is verified. Then validation system chaincode (VSCC) is run on each transaction where the endorsements are validated and the endorsement policy of the associated chaincode is evaluated. A transaction is marked as invalid if its endorsement policy is not satisfied.

In step 3, a multi-version concurrency control (MVCC) check is performed. This check ensures that there are no read-write conflicts between the valid transactions. In other words, it avoids the double-spending problem where two transactions are committed when only one transaction was intended. The read set of each transaction is computed again by accessing a state database (illustrated as "statedb" in FIG. 1) and is compared to the read set from the endorsement phase. If these read sets are different, then some other transaction (either in this block 105 or an earlier block) has already modified the same keys, and hence this transaction is marked as invalid.

In the final step 4, the block is committed to the stored ledger at the node. In one embodiment, the entire block is first written to the ledger with its transactions' valid/invalid flags. Then, the write sets of the valid transactions are committed to the state database.

Figure 2A:
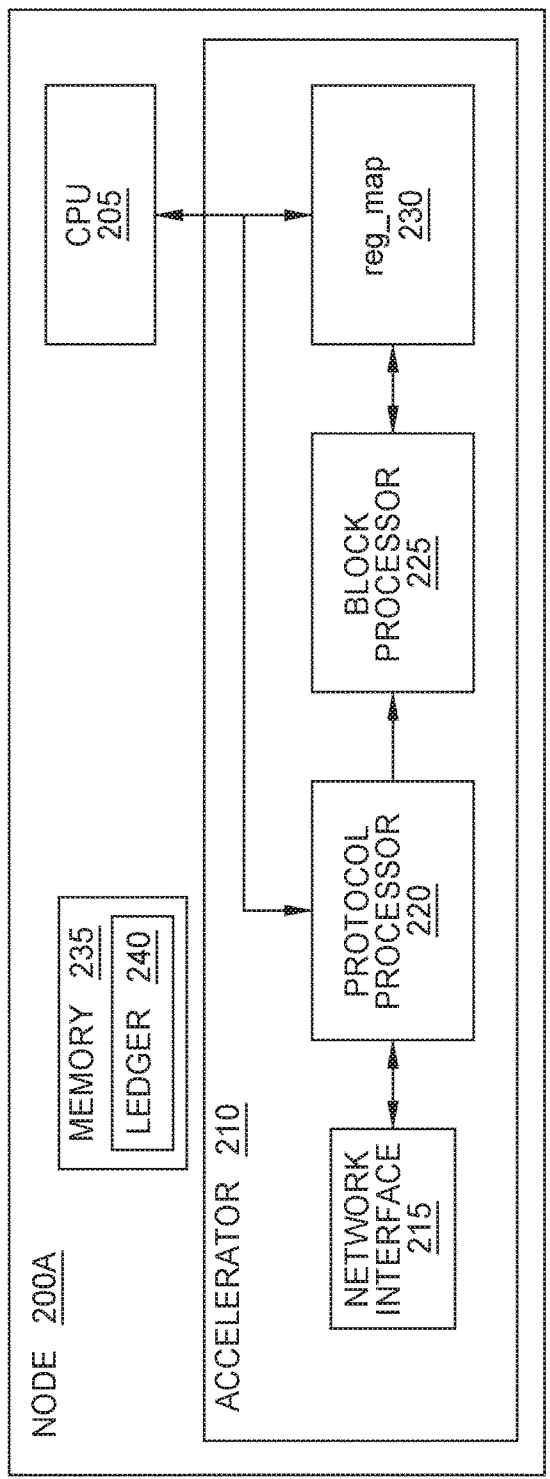
FIGS. 2A and 2B are block diagrams of nodes in a blockchain with a hardware accelerator, according to an example.
Figure 2B:
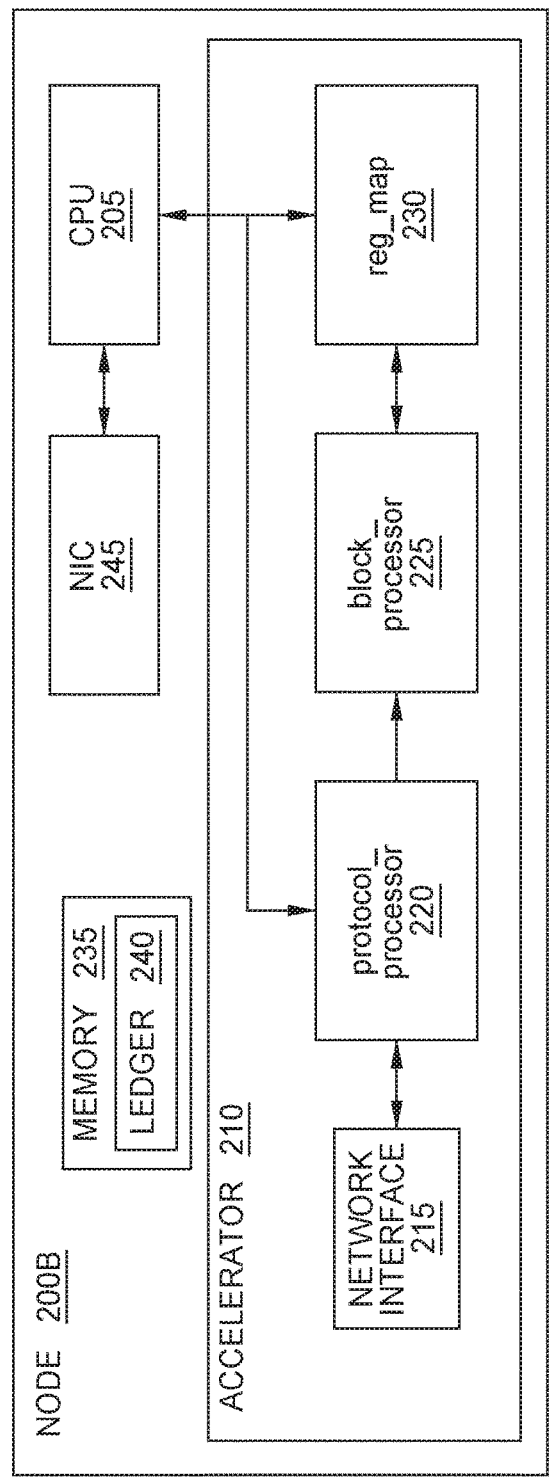

FIGS. 2A and 2B are block diagrams of nodes 200 in a blockchain with a hardware accelerator 210, according to an example. In one embodiment, the node 200 is any computing system that performs a validation process when committing transactions to a blockchain. For example, the node 200 may be an endorsing or non-endorsing node or peer as shown in FIG. 1. In one embodiment, the node 200 is a server or other computing system.

In FIG. 2A, the node 200A includes a CPU 205, the hardware accelerator 210, and memory 235. The CPU 205 represents any number of processors that each can contain any number of processing cores. The memory 235 represents volatile memory, non-volatile memory (e.g., a hard disk drive), and combinations thereof. As shown, the memory 235 stores a ledger 240 which lists the committed transactions of a blockchain.

The hardware accelerator 210 contains various circuit elements for performing the validation workflow 110 illustrated in FIG. 1. In one embodiment, the hardware accelerator 210 is an integrated circuit. In another embodiment, the hardware accelerator 210 is a board (e.g., a printed circuit board (PCB) such as a PCIe card) on which one or more integrated circuits are mounted. In one embodiment, the integrated circuit is a field programmable gate array (e.g., FPGA) or a system on a chip (SoC) that comprises programmable logic. In this example, the various circuit blocks in the accelerator 210 are implemented in programmable logic. However, in another embodiment, the integrated circuit may be an application specific integrated circuit (ASIC) where the circuit blocks of the accelerator 210 are implemented only in hardened circuitry. While using an FPGA and SoC with programmable logic gives the accelerator 210 the flexibility to be reprogrammed if the validation process is changed, using an ASIC may save space.

The accelerator 210 includes a network interface 215 for receiving Ethernet packets containing data regarding the transactions, a protocol processor 220 for reformatting the data, a block processor 225 for performing the validation workflow, and a register map 230 (reg_map) (e.g., memory registers) which store the results of the validation. The protocol processor 220, the block processor 225, and the register map 230 are discussed in more detail below. In general, these hardware blocks work together to validate a received block of transactions. That is, the network interface 215 receives multiple packets which include data corresponding to a block of transactions. Because this data may be in a format that is unsuitable for processing, the protocol processor 220 can reformat and output the data for the block processor 225 for consumption. While the block processor 225 performs most of the steps in the validation workflow, some of these steps may be performed by the protocol processor 220 and the register map 230. Further, because the ledger 240 is stored in the memory 235 (which may not be directly accessible by the accelerator 210), the node 200A may rely on the CPU 205 to commit validated transactions to the ledger 240. That is, the accelerator 210 can store the validation results in the register map 230 which the CPU 205 can evaluate and then commit the transactions to the ledger. That is, in one embodiment all the transactions are committed to the ledge but the validation flags store the information about which ones were valid and which were invalid. However, for the state database (which is discussed below), only successfully validated transactions are committed. While most of the validation is performed in the hardware accelerator 210, committing the transactions to the ledger 240 may be performed by software executing on the CPU 205.

FIG. 2B illustrates a node 200B that is the same as the node 200A in FIG. 2A except for the addition of a network interface card (NIC) 245. In one embodiment, the NIC 245 provides the node 200B with the ability to determine what network traffic flows through the accelerator 210 and what network traffic flows through the NIC 245. In one embodiment, all traffic related to the blockchain may be sent through the accelerator 210 while received network traffic that is not related to the blockchain is processed by the NIC 245. In contrast, in node 200A all the network traffic received by the node 200A (whether blockchain or non-blockchain traffic) may be received at the accelerator 210. For example, the protocol processor 220 may forward the network traffic related to validation to the block processor 225 but forward all other traffic to the CPU 205.

In another embodiment, the accelerator 210 receives only the network traffic related to validating transactions at the accelerator 210 while all other traffic (whether it is other types of blockchain traffic such as an endorsement request, or non-blockchain traffic) is received and processed by the NIC 245.

In yet another embodiment not shown in either FIG. 2A or 2B, the accelerator 210 may perform all blockchain operations without the aid of the CPU 205. In that embodiment, the NIC 245 and the CPU 205 are not used to perform blockchain tasks, although the CPU 205 may be used to configure or control the accelerator 210. In this scenario, all network traffic goes through the accelerator 210 which processes the blockchain related packets but forwards other packets to/from the CPU 205.

Figure 3:
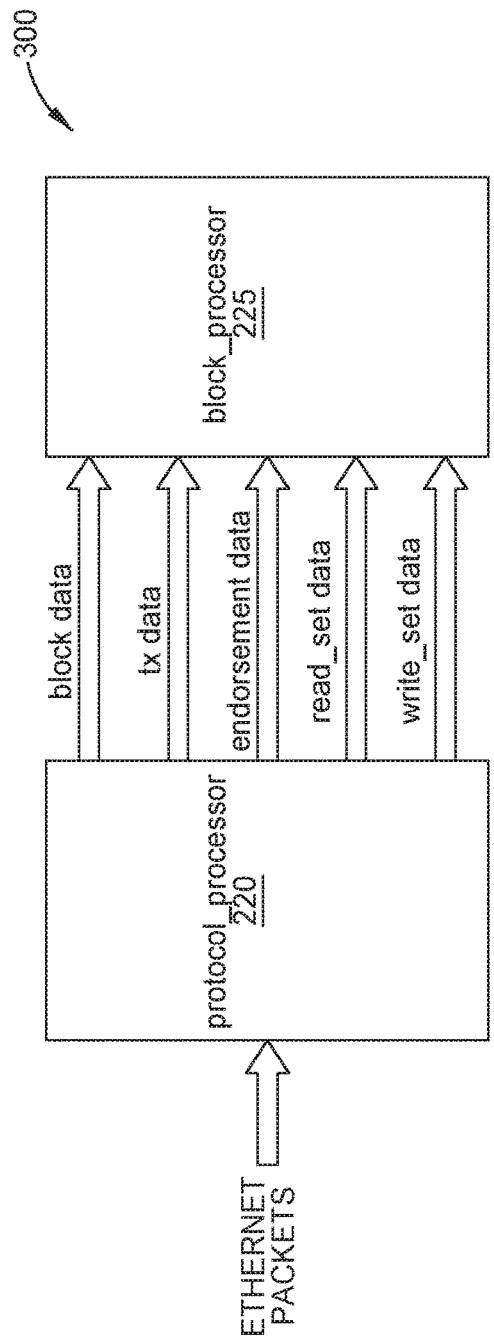
FIG. 3 illustrates an interface between a protocol processor and a block processor in the hardware accelerator, according to an example.

FIG. 3 illustrates an interface 300 between a protocol processor and block processor in the hardware accelerator, according to an example. In this example, the interface 300 is used to transmit block data, transaction data (labeled as tx data in FIG. 3), endorsement data, read set data, and write set data to the block processor 225. That is, the protocol processor 220 receives Ethernet packets from other nodes in the blockchain (e.g., from orderers in the ordering service) that contain the information used to validate a block of transactions. The protocol processor 220 then reformats/parses the data so that it can be consumed by the block processor 225.

Figure 4:
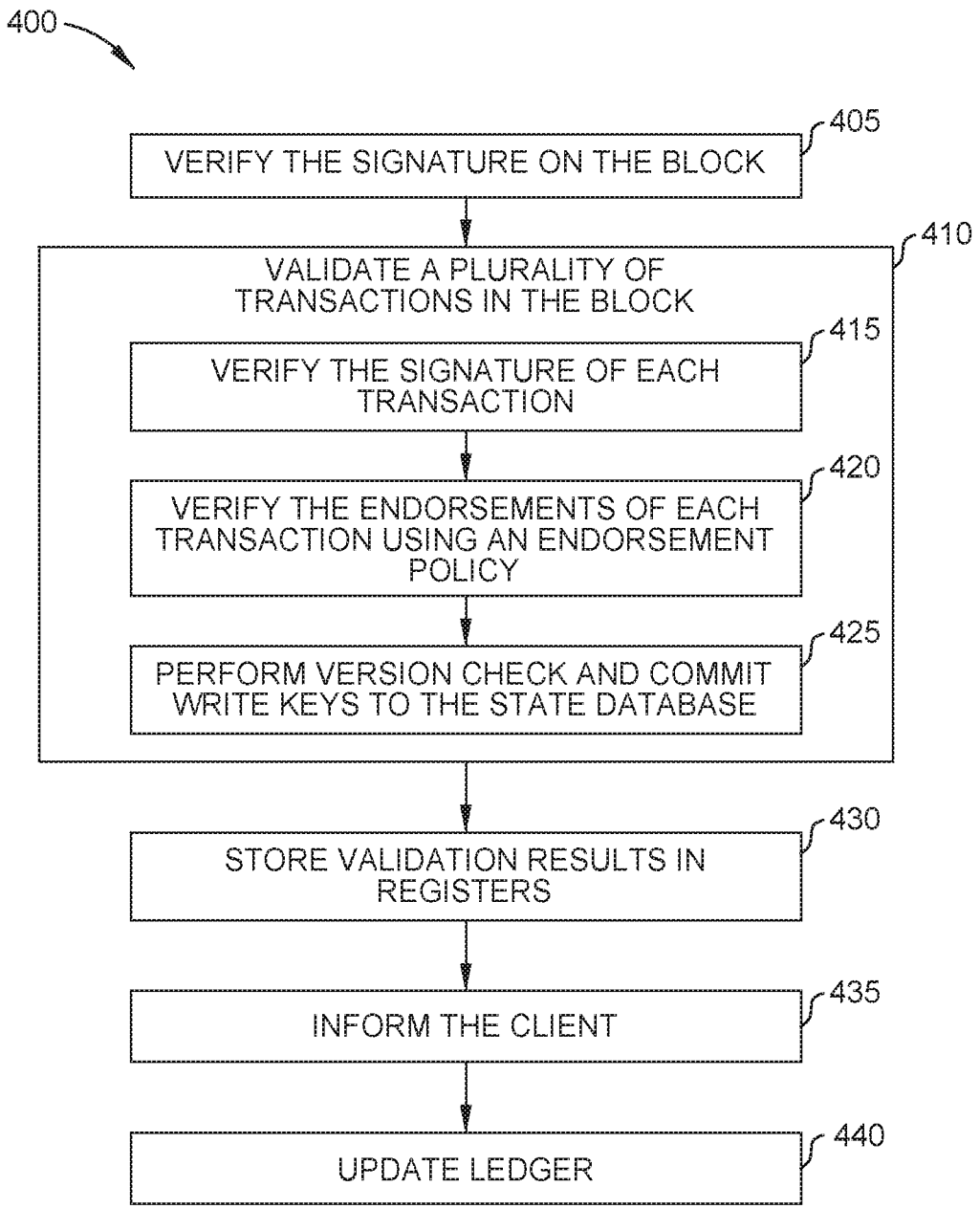
FIG. 4 is a flowchart for validating transactions before committing the transactions into a blockchain ledger, according to an example.

FIG. 4 is a flowchart of a method 400 for validating transactions before committing the transactions into a blockchain ledger, according to an example. For ease of explanation, the different stages in the method 400 are described in tandem with FIGS. 5-7 below. Further, the stages in the method 400 correlate to the steps 1-4 of the validation workflow 110 illustrated in FIG. 1.

The method 400 assumes that the hardware accelerator has already received a block of transactions from, e.g., an ordering service that need to be validated before they can be committed to the ledger. Further, the method 400 assumes that the protocol processor has performed a block syntax check (e.g., "blk syntax check" in FIG. 1) and a transaction syntax check (e.g., "tx syntax check" in FIG. 1) to confirm that all the required data for performing validation has been received.

Figure 5:
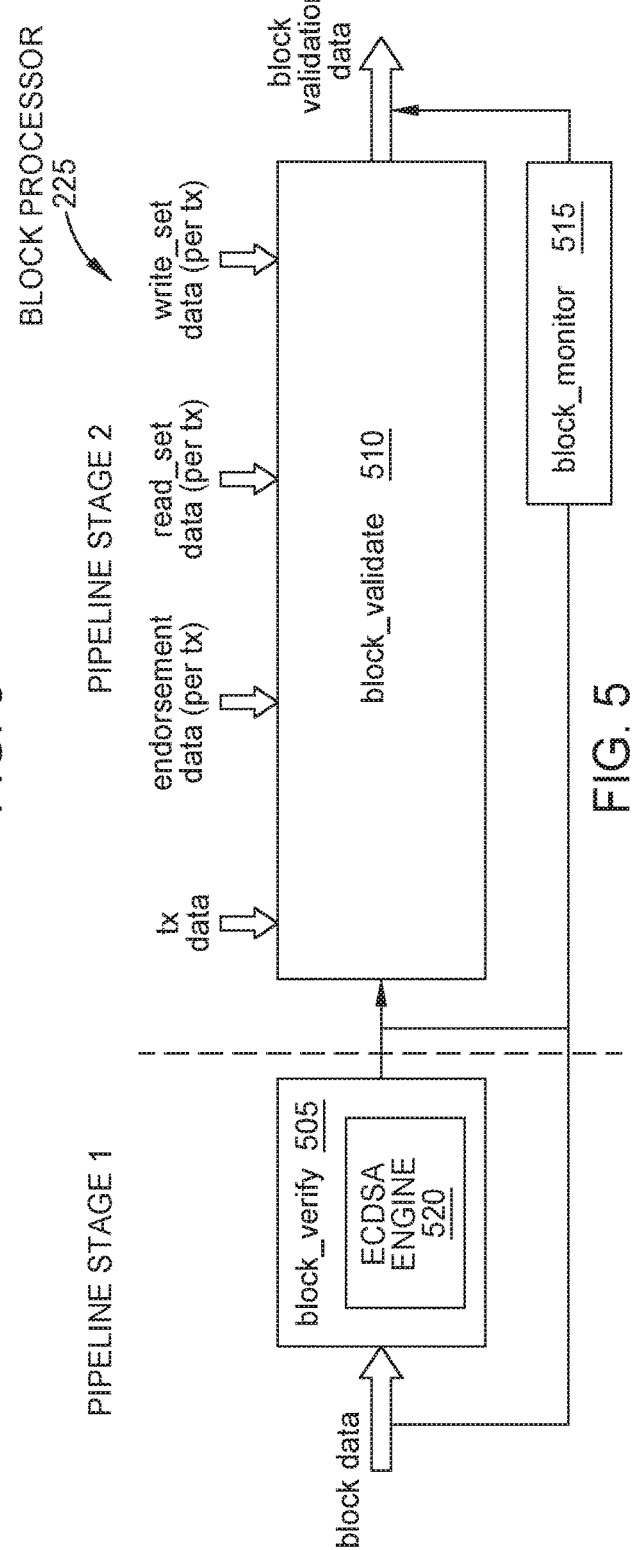
FIG. 5 is a block diagram of the block processor, according to an example.

At stage 405, the hardware accelerator verifies the signature on a block of transactions. More specifically, the block processor receives the information shown in FIG. 3 from the protocol processor so it can perform block verification. As shown in FIG. 5, the block processor 225 includes two hardware sub-modules: block verify 505 and block validate 510. The block verify 505 includes an elliptic curve digital signature algorithm (ECDSA) engine 520 for verifying that the orderer signature on the block. Put differently, the ECDSA engine 520 compares a received signature in the block to a known signature (e.g., certificate) for the orderer to ensure they match. That way, the block verify 505 can confirm that the block of transactions came from an approved node. While an ECDSA engine 520 is shown, any suitable signature algorithm engine can be used.

In addition to including the orderer signature, the block data received at the block verify 505 can also include a block number, the number of transactions in the block, and the like.

Returning to the method 400, at stage 410, the hardware accelerator validates the plurality of transactions in the block. In FIG. 5, this function is performed by the block validate 510. That is, while the block verify 505 ensures the block was received by a known orderer, the block validate 510 validates the individual transactions in the block. To do this, the block validate 510 receives the transaction data, endorsement data, read set data, and the write set data from the protocol processor (not shown in FIG. 5). The block validate 510 then outputs block validation data which contains validation results such as the block number, valid/invalid transaction flags, latency, and the like.

In one embodiment, the block verify 505 and block validate 510 are pipelined at a block-level. That is, the block processor 225 can processes a first block of transactions at the block verify 505 (pipeline stage 1) while the block validate 510 processes a second block of transactions (pipeline stage 2). Put differently, the block verify 505 can use the ECDSA engine 520 to ensure an authorized orderer transmitted the first block at the same time the block validate 510 validates the individual transactions in a second block.

The block processor 225 also includes a block monitor 515 which gathers block-level and transaction-level statistics by monitoring signals received from the block verify 505 and the block validate 510. For example, the block monitor 515 may determine the time or latency required to validate the blocks of transactions, or the throughput of the block processor 225 (e.g., the number of blocks processed per unit of time).

Further, FIG. 4 illustrates that stage 410 can be subdivided into stages 415-425. In one embodiment, stages 415-425 of the method 400 correspond to the pipeline stages 2a, 2b, and 2c in FIG. 6 which illustrates a more detailed view of the block validate 510 in FIG. 5.

Figure 6:
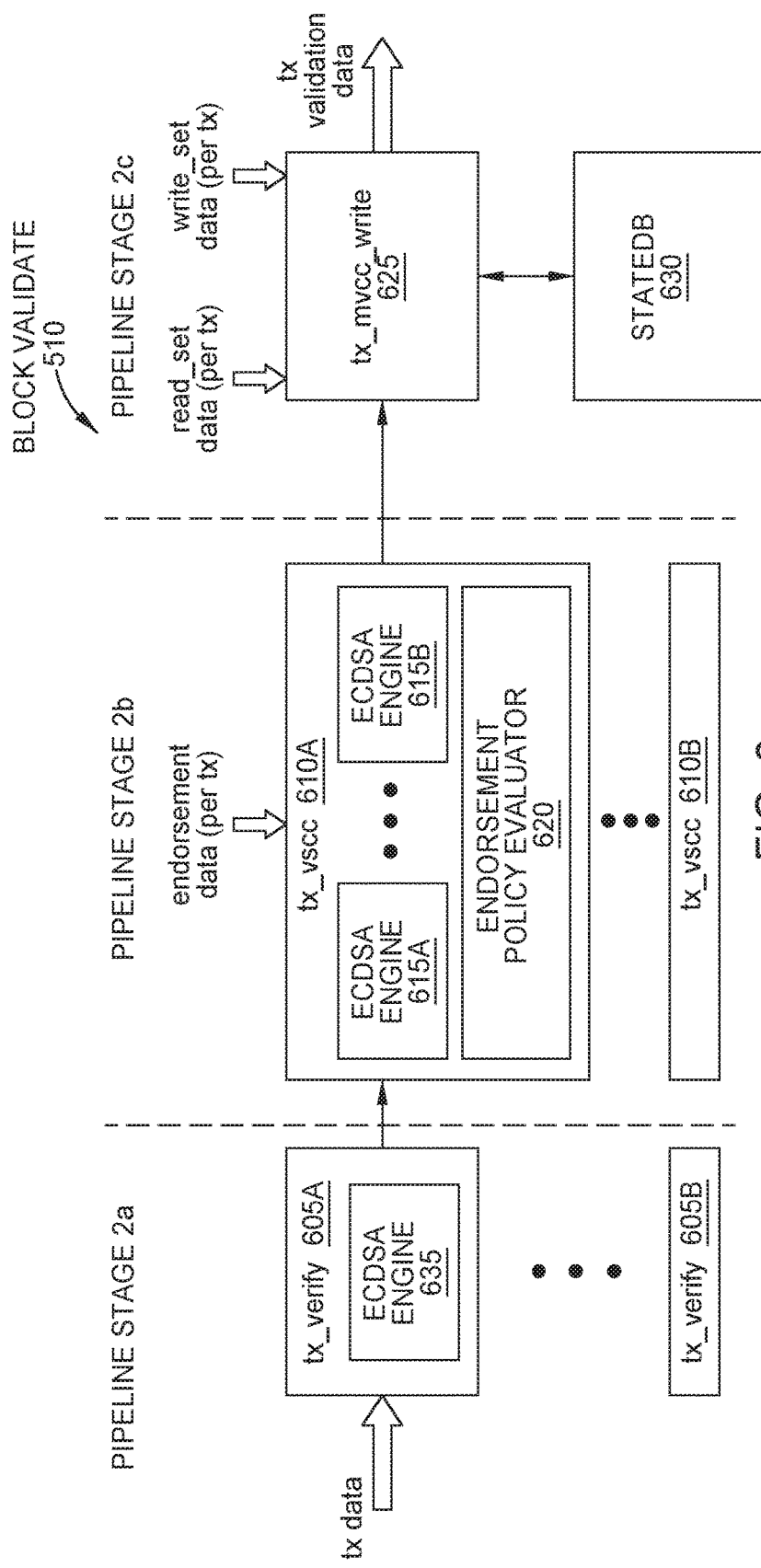
FIG. 6 is a block diagram of a block validate, according to an example.

At stage 415, the first pipeline stage 2a in the block validate 510 verifies the signature of each transaction. As shown in FIG. 6, the stage 2a includes multiple transaction verify blocks 605 which each include an ECDSA engine 635. These engines 635 verify the signature of the client (or creator) of the transaction. That is, the ECDSA engines 635 ensure the transaction was signed by a known client by comparing the received signature to a signature calculated based on tx data and creator's public key pair.

Because there are multiple transaction verify blocks 605, stage 2a can validate the client signatures for multiple transactions in parallel. It is a design choice to determine how many of the transaction verify blocks 605 the block validate 510 includes. Having additional transaction verify blocks 605 means stage 2a can process more transactions in parallel but at a cost of using additional space and power in the accelerator.

Returning to the method 400, at stage 420, the block validate 510 verifies the endorsements of each transaction using an endorsement policy. As shown in FIG. 6, the pipeline stage 2b includes multiple transaction VSCC blocks 610 that each includes multiple ECDSA engines 615 (or any other type of signature verification engine) and an endorsement policy evaluator 620. The transaction VSCC blocks 610 each verifies the endorsements of a particular transaction. To do so, the transaction VSCC blocks 610 receive the endorsement data which includes an endorser ID and verification data. Because a client transaction may receive multiple endorsements (as shown in FIG. 1), each ECDSA engine 615 can evaluate one of the endorsements in parallel. That is, if Transaction A received two endorsements, the ECDSA engine 615A can verify that the first endorsement was signed by an approved endorsing node at the same time the ECDSA engine 615B verifies that the second endorsement was signed by an approved endorsing node. Again, the number of ECDESA engines 615 in each block 610 is a design choice.

In one embodiment, the endorsement policy evaluator 620 may maintain endorsement policies on a per-chaincode basis. The evaluator 620 confirms that the transaction has received the appropriate endorsements. That is, assuming the endorsements were given by approved endorsing nodes, the evaluator 620 confirms the transaction received endorsements from the appropriate endorsing nodes. For example, if the transaction indicates that money should be transferred between two banks, the evaluator 620 may check to ensure the transaction received endorsements from endorsing nodes operated by both of those banks. If the transaction was endorsed by endorsing nodes for only one bank, or by a different bank not affected by the transaction, the evaluator 620 may invalidate the transaction.

Because stage 2b include multiple transaction VSCC blocks 610, the block validate 510 can verify the endorsements for multiple transactions in parallel. That is, after stage 2a verifies that the transactions were originated by approved clients, stage 2b can verify that the endorsements for the transactions are valid and satisfy one or more endorsement policies. The number of transaction VSCC blocks 610 in the block validate 510 is a design choice.

Returning to the method 400, at stage 425 the block validate 510 performs version check and commits write keys to a state database 630. This is performed by stage 2c which includes a transaction MVCC write block 625 which is communicatively coupled to the state database 630 and the register maps (not shown in FIG. 6). Further, the register maps are optionally coupled to a CPU (not shown) in the node. In one embodiment, the transaction MVCC write block 625 looks up read keys from the state database 630 to perform the version check, and if confirmed, commits updated write keys of valid transactions to the database 630. To do so, the transaction MVCC write block 625 receives the read set data (where each element contains a read key-version pair) and the write set data (where each element contains a write key-value pair) from the protocol processor. In one embodiment, the state database 630 includes an internal lock mechanism to disallow reading of the key that is current being written (or updated).

The stages 2a-2c in FIG. 6 can be pipelined. That is, while FIG. 5 illustrates a block-level pipeline between the block verify 505 and the block validate 510, FIG. 6 illustrates that a transaction-level pipeline where the transactions in a particular block can be processed in parallel in the stages 2a-2c. That is, stage 2a can process a first set of transactions in a block, while stage 2b processes a second set of transactions in the same block, and stage 2c processes a third set of transactions in the same block. However, in one embodiment, because of dependency between transactions, the block validate 510 may process only transactions from the same block. That is, one stage in the block validate 510 may not be able to process transactions from a first block while a different stage processes transactions from a second block.

Figure 7:
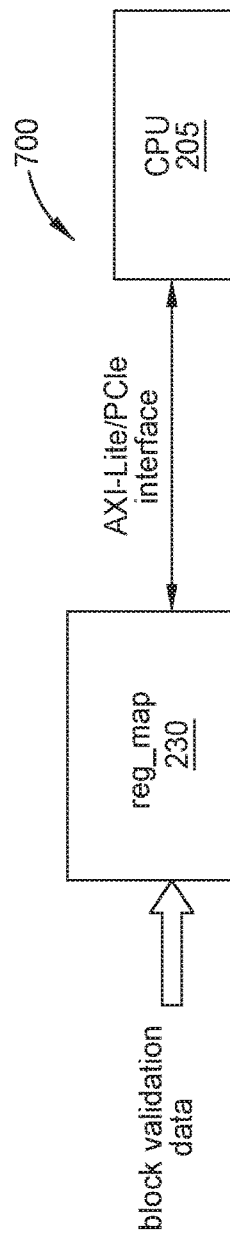
FIG. 7 illustrates communication between registers in the hardware accelerator and a CPU, according to an example.

Returning to the method 400, at stage 430 the block validate 510 stores results of performing the validation process in the registers (e.g., the register map 230). As shown in FIG. 7, the register map receives block validation data from the block validate 510 which may contain block number, valid/invalid transaction flags, latency (as measured by the block monitor), and the like. The validation results are written in the register map where the CPU 205 can use an AXI-lite or a PCIe interface to access the validation results. In one embodiment, new validation results cannot be written into the register map 230 until the currently stored validation results have been read out by the CPU 205. Further, while FIG. 7 illustrates a system 700 where the register map 230 in the hardware accelerator is accessible by the CPU 205, as mentioned above, the accelerator may not use the CPU 205, and can instead complete the validation process without the aid of software executing on the CPU 205.

At stage 435, the CPU (or the hardware accelerator) informs the client whether the transactions are valid or invalid. That is, the CPU can evaluate the validation results to determine whether each individual transaction in the block of transactions was validated. The client may then choose to resubmit the invalid transactions.

At stage 440, the transactions are committed to the ledger. In one embodiment, both the valid and invalid transactions are committed to the ledger, and can include valid/invalid flags to indicate whether the committed transactions are valid or not.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:
1. A hardware accelerator, comprising:
  circuitry configured to:
    receive a block of transactions to be committed to a ledger of a blockchain;
    verify a signature of the block using a block verify;

validate each of the transactions in the block using a block validate, wherein the block verify and the block validate are pipelined at a block level such that the block verify is configured to verify a signature of a first block in parallel with the block validate validating each of the transactions in a second block, wherein the first and second blocks are received at the hardware accelerator at different times, wherein the first and second blocks contain different sets of transactions; and store validation results of the transactions, wherein one of a processor in a computing system or the hardware accelerator is configured to commit the transactions to the ledger.

2. The hardware accelerator of claim 1, further comprising at least one of a system on a chip (SoC), a field programmable gate array (FPGA), or an application specific integrated circuit (ASIC).

3. The hardware accelerator of claim 2, wherein the SoC or FPGA comprises programmable logic.

4. The hardware accelerator of claim 2, wherein the ASIC comprises only hardened circuitry.

5. The hardware accelerator of claim 1, further comprising:
a network interface configured to receive the block of transactions from another node in the blockchain, wherein the block of transactions are included in a plurality of packets;
a protocol processor configured to parse the plurality of packets to generate data regarding the transactions; and
a block processor configured to receive the data from the protocol processor, verify the signature of the block, and validate each of the transactions in the block.

6. The hardware accelerator of claim 5, wherein the block processor comprises:
the block verify comprising a first signature algorithm engine configured to verify that the signature of the block matches a known signature of an orderer in the blockchain; and
the block validate configured to validate each of the transactions in the block, wherein an output of the block verify is coupled to an input of the block validate.

7. The hardware accelerator of claim 6, wherein the block validate comprises:
a transaction verify module comprising a second signature algorithm engine configured to verify that signatures corresponding to the transactions match known signatures of clients authorized to use the blockchain;
a transaction validation system chaincode (VSCC) block comprising:
a third signature algorithm engine configured to verify that endorsements in the transactions were signed by known endorsing nodes in the blockchain; and
an endorsement policy evaluator configured to ensure the endorsements satisfy an endorsement policy; and
a transaction multi-version concurrency control (MVCC) write block configured to read and write key-value pairs associated with the transactions in a state database.

8. An integrated circuit for accelerating a validation process for a blockchain, comprising:
a network interface configured to receive a plurality of packets containing a block of transactions from a node in the blockchain;
a protocol processor comprising circuitry configured to parse the plurality of packets to generate data regarding the transactions; and a block processor comprising circuitry configured to:
verify a signature of the block using a block verify;
validate each of the transactions in the block using a block validate, wherein the block verify and the block validate are pipelined at a block level such that the block verify is configured to verify a signature of a first block in parallel with the block validate validating each of the transactions in a second block, wherein the first and second blocks are received at the block processor at different times, wherein the first and second blocks contain different sets of transactions; and
store validation results of the transactions.

9. The integrated circuit of claim 8, wherein the integrated circuit comprises at least one of a system on a chip (SoC), a field programmable gate array (FPGA), or an application specific integrated circuit (ASIC).

10. The integrated circuit of claim 9, wherein the SoC or FPGA comprises programmable logic.

11. The integrated circuit of claim 9, wherein the ASIC comprises only hardened circuitry.

12. The integrated circuit of claim 8, wherein the block processor comprises:
the block verify comprising a first signature algorithm engine configured to verify that the signature of the block matches a known signature of an orderer in the blockchain; and
the block validate configured to validate each of the transactions in the block.

13. The integrated circuit of claim 12, wherein the block validate comprises:
a transaction verify module comprising a second signature algorithm engine configured to verify that signatures corresponding to the transactions match known signatures of clients authorized to use the blockchain;
a transaction validation system chaincode (VSCC) block comprising:
a third signature algorithm engine configured to verify that endorsements in the transactions were signed by known endorsing nodes in the blockchain; and
an endorsement policy evaluator configured to ensure the endorsements satisfy an endorsement policy; and
a transaction multi-version concurrency control (MVCC) write block configured to read and write key-value pairs associated with the transactions in a state database.

14. The integrated circuit of claim 13, wherein the block validate comprises:
a plurality of transaction verify modules configured to operate in parallel to verify signatures of a first set of the transactions; and
a plurality of transaction VSCC blocks configured to operate in parallel to verify endorsements of a second set of the transactions,
wherein the plurality of transaction verify modules form a first stage of a pipeline and the plurality of transaction VSCC blocks form a second stage of the pipeline such that the plurality of transaction verify modules processes the first set of transactions at the same time the plurality of transaction VSCC blocks processes the second set of transactions.

15. The integrated circuit of claim 14, wherein each of the plurality of transaction verify modules comprises a plurality of algorithm signature engines for verifying a set of endorsements in one of the transactions in parallel.

16. The integrated circuit of claim 9, wherein the block verify forms a first stage in a pipeline while the block validate forms a second stage in the pipeline such that the block verify can process a first block of transactions for the blockchain at the same time the block validate processes a second block of transactions for the blockchain.

17. A method, comprising:
    receiving, at a hardware accelerator, a first block of transactions and a second block of transaction to be committed to a ledger of a blockchain;
    verifying, at the hardware accelerator, a signature of the first block;
    validating, at the hardware accelerator, each of the transactions in the first block in parallel with the hardware accelerator verifying a signature of the second block, wherein the first and second blocks are received at the hardware accelerator at different times, wherein the first and second block contain different sets of transactions;
    storing, at the hardware accelerator, validation results of the transactions; and
    committing the transactions to the ledger and indicating whether the transactions are valid based on the validation results.

18. The method of claim 17, wherein receiving the first block of transactions comprises receiving a plurality of packets comprising the first block of transactions, the method further comprising:
    parsing, at the hardware accelerator, the plurality of packets to generate data regarding the transactions.

19. The method of claim 17, wherein validating each of the transactions in the block further comprises:
    verifying that the signature of the block matches a known signature of an orderer in the blockchain.

20. The method of claim 17, wherein validating each of the transactions in the first block further comprises:
    verifying that endorsements in the transactions were signed by a known endorsing node in the blockchain; and
    ensuring the endorsements in the transactions satisfy an endorsement policy.

* * * * *